United States Patent
Kim et al.

(10) Patent No.: US 9,026,361 B2
(45) Date of Patent: May 5, 2015

(54) METHOD OF CALCULATING ACCURACY OF MEASURING LOCATION, AND METHOD AND APPARATUS FOR MEASURING LOCATION OF TERMINAL USING ACCURACY OF MEASURING LOCATION

(75) Inventors: Eung Sun Kim, Suwon-si (KR); Dohyung Park, Seoul (KR); Yong Kim, Seoul (KP)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 13/600,956

(22) Filed: Aug. 31, 2012

(65) Prior Publication Data

US 2013/0080048 A1 Mar. 28, 2013

(30) Foreign Application Priority Data

Sep. 26, 2011 (KR) .................. 10-2011-0096908

(51) Int. Cl.
*G01C 21/20* (2006.01)
*H04W 4/02* (2009.01)

(52) U.S. Cl.
CPC .............. *G01C 21/20* (2013.01); *H04W 4/021* (2013.01)

(58) Field of Classification Search
CPC ....... G01S 19/42; G01S 21/28; G01S 19/258; G01C 21/3461; G01C 21/3484
USPC ........ 701/400, 408, 409, 425, 430, 431, 445, 701/449, 450, 455, 469
See application file for complete search history.

(56) References Cited

U.S. PATENT DOCUMENTS

| 7,212,563 B2* | 5/2007 | Boyd et al ................ 375/130 |
| 7,630,943 B2 | 12/2009 | Nerguizian et al. |
| 7,751,829 B2* | 7/2010 | Masuoka et al. ......... 455/456.1 |
| 7,904,244 B2 | 3/2011 | Sugla |
| 8,594,698 B2* | 11/2013 | Shkedi ................... 455/456.1 |
| 2008/0039114 A1* | 2/2008 | Phatak et al. ............ 455/456.1 |
| 2011/0018732 A1* | 1/2011 | Cho et al. ................ 340/825.49 |
| 2013/0018826 A1* | 1/2013 | Sundararajan et al. ...... 706/12 |

FOREIGN PATENT DOCUMENTS

| KR | 10-0848322 | 7/2008 |
| KR | 10-2011-0035989 | 4/2011 |

* cited by examiner

*Primary Examiner* — Mary Cheung
(74) *Attorney, Agent, or Firm* — NSIP Law (57) ABSTRACT

A method of calculating an accuracy of measuring a location, and a method and apparatus to measure a location of a terminal using the accuracy of measuring the location, are provided. The method of calculating the accuracy of measuring the location of the terminal includes providing a map corresponding to a location measurement type that is used in the terminal. The method further includes reading, from the map, map information of a predetermined area including the location of the terminal. The method further includes calculating the accuracy of measuring the location with the location measurement type based on the map information.

11 Claims, 7 Drawing Sheets

FIG. 8

METHOD OF CALCULATING ACCURACY OF MEASURING LOCATION, AND METHOD AND APPARATUS FOR MEASURING LOCATION OF TERMINAL USING ACCURACY OF MEASURING LOCATION

CROSS-REFERENCE TO RELATED APPLICATION(S)

This application claims the benefit under 35 U.S.C. §119 (a) of Korean Patent Application No. 10-2011-0096908, filed on Sep. 26, 2011, in the Korean Intellectual Property Office, the entire disclosure of which is incorporated herein by reference for all purposes.

BACKGROUND

1. Field

The following description relates to a method of calculating an accuracy of measuring a location, and a method and apparatus to measure a location of a terminal using the accuracy of measuring the location.

2. Description of Related Art

With the development of information and communication technology, ubiquitous computing has arrived based on the spread of network infrastructure, and the generalization of advanced digital equipment in daily life. In order to meet the varied needs of customers of ubiquitous computing, services requested by a customer should be provided to the customer even when the customer is not directly involved with the service. Accordingly, a ubiquitous service includes a computer recognizing an action and location of a customer.

Location-based services have been developed for an outdoor environment using a Global Positioning System (GPS). However, the propagation of various technologies, the spread of smartphone use, and user needs have resulted in an increasing desire for a service that tracks location in an indoor environment. The location-based service in an indoor environment can be applied to various fields, for example, a circumference search in a large shopping mall and a supermarket, an indoor navigation that may be used in a museum, a factory, and a building, location tracking of a patient and a doctor in a hospital, a guide terminal for the visually-handicapped, and the like. Although various devices are used in an indoor environment, such devices have not been able to adequately measure a location in the indoor environment.

SUMMARY

In one general aspect, there is provided a method of calculating an accuracy of measuring a location of a terminal, the method including providing a map corresponding to a location measurement type that is used in the terminal. The method further includes reading, from the map, map information of a predetermined area comprising the location of the terminal. The method further includes calculating the accuracy of measuring the location with the location measurement type based on the map information.

The calculating of the accuracy of measuring the location further comprises calculating the accuracy of measuring the location based on a distance between a first location and a second location that are predetermined in the predetermined area, and a difference between a first point corresponding to the first location and a second point corresponding to the second location, in the map information.

The method further includes displaying, on the terminal, the accuracy of measuring the location.

The method further includes adjusting a size of the predetermined area.

The method further includes recalculating the accuracy of measuring the location based on map information of the adjusted predetermined area.

In another general aspect, there is provided method of measuring a location of a terminal based on an accuracy of measuring the location, including calculating the accuracy of measuring the location, of each of at least two location measurement types, based on the location of the terminal. The method further includes selecting one of the at least two location measurement types based on the accuracy of measuring the location, of each of the at least two location measurement types. The method further includes measuring the location of the terminal based on the selected one of the at least two location measurement types.

The calculating of the accuracy of measuring the location further includes calculating the accuracy of measuring the location, of each of at least two location measurement types, based on the location of the terminal and a map of each of the at least two location measurement types.

The calculating of the accuracy of measuring the location further comprises providing a map of each of the at least two location measurement types that are used in the terminal. The calculating of the accuracy of measuring the location further includes reading, from the map of each of the at least two location measurement types, map information of a predetermined area comprising the location of the terminal. The calculating of the accuracy of measuring the location further includes calculating the accuracy of measuring the location, of each of the at least two location measurement types, based on the map information.

The calculating of the accuracy of measuring the location further comprises calculating the accuracy of measuring the location, of each of the at least two location measurement types based on a distance between a first location and a second location that are predetermined in the predetermined area, and a difference between a first point corresponding to the first location and a second point corresponding to the second location, in the map information.

The method further includes adjusting a size of the predetermined area.

The method further includes recalculating the accuracy of measuring the location, of each of the at least two location measurement types, based on map information of the adjusted predetermined area.

The method further includes displaying, for a user of the terminal, the accuracy of measuring the location, of each of the at least two location measurement types.

The method further includes receiving, from the user of the terminal, an input of information regarding the selected one of the at least two location measurement types.

A non-transitory computer-readable storage medium storing a program comprising instructions to cause a computer to perform the method, is provided.

In still another general aspect, there is provided an apparatus configured to calculate an accuracy of measuring a location of a terminal, including a memory configured to store a map corresponding to a location measurement type that is used in the terminal. The apparatus further includes a reading unit configured to read, from the map, map information of a predetermined area comprising the location of the terminal. The apparatus further includes a calculating unit configured to calculate the accuracy of measuring the location with the location measurement type based on the map information.

The calculating unit is further configured to calculate the accuracy of measuring the location based on a distance between a first location and a second location that are predetermined in the predetermined area, and a difference between a first point corresponding to the first location and a second point corresponding to the second location, in the map information.

The apparatus further includes an adjusting unit configured to adjust a size of the predetermined area.

The calculating unit is further configured to calculate the accuracy of measuring the location based on map information of the adjusted predetermined area.

In yet another general aspect, there is provided an apparatus configured to measure a location of a terminal based on an accuracy of measuring a location, including a calculating module configured to calculate the accuracy of measuring the location, of each of at least two location measurement types, based on the location of the terminal. The apparatus further includes a selecting module configured to select one of the at least two location measurement types based on the accuracy of measuring the location, of each of the at least two location measurement types. The apparatus further includes a location measuring module configured to measure the location of the terminal based on the selected one of the at least two location measurement types.

The apparatus further includes a database configured to store a map of each of the at least two location measurement types that are used in the terminal. The calculating module further includes a reading unit configured to read, from the map of each of the at least two location measurement types, map information of a predetermined area comprising the location of the terminal. The calculating module further includes a calculating unit configured to calculate the accuracy of measuring the location, of each of the at least two location measurement types, based on the map information.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
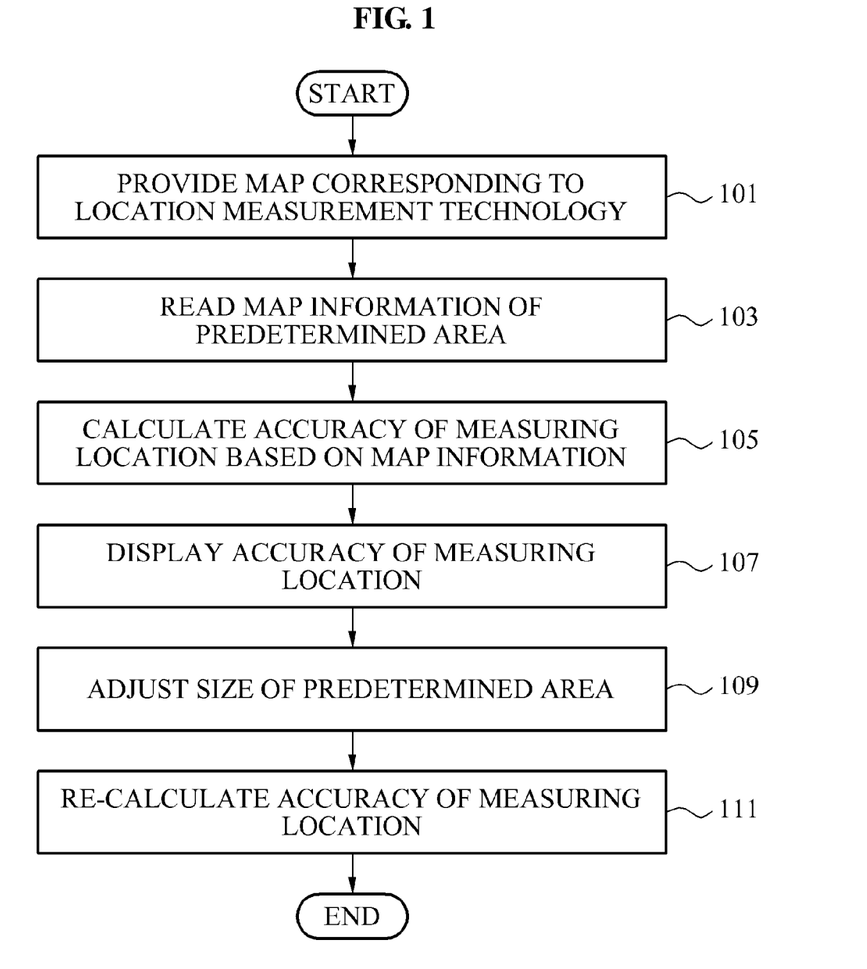
FIG. 1 is a flowchart illustrating an example of a method of calculating an accuracy of measuring a location.

FIG. 1 illustrates an example of a method of calculating an accuracy of measuring a location. At step 101, an apparatus configured to calculate an accuracy of measuring a location, which will be hereinafter referred to as a "calculating apparatus", may provide a map corresponding to a location measurement technology (e.g., a wireless local area network (WLAN), geomagnetic field, etc.) that is used in a terminal. For example, the calculating apparatus may call the map corresponding to the location measurement technology, among various maps stored in, for example, an internal memory, an external memory, a database, and/or the like. The various maps may include, for example, a reference map generated in advance, a fingerprint map, and/or the like. The calculating apparatus may generate the fingerprint map, using information stored in, for example, the memory, the database, and/or the like. In step 101, the providing of the map may include performing the aforementioned various operations.'

In an example, the fingerprint map may include a map prepared by a fingerprint scheme. The fingerprint scheme may include a location recognition scheme that may determine a location of a terminal by comparing a strength of a signal measured in the terminal to a strength of a signal measured in advance. The strength of the signal measured in advance may be stored in, for example, a database and/or the like, and a strength of a signal received by the terminal from all Access Points (APs) in each location may be stored in the database. The fingerprint map may be classified, based on a location measurement technology that is used in a terminal, into, for example, a WLAN fingerprint map, a geomagnetic field fingerprint map, a vision fingerprint map, and a magnetic field map that is measured in advance for each indoor location, and/or the like.

Figure 2:
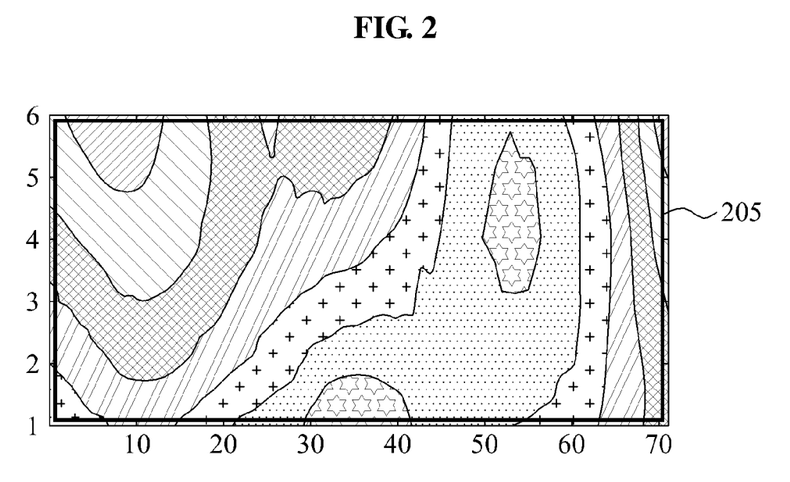
FIG. 2 is a diagram illustrating an example of a fingerprint map used to calculate an accuracy of measuring a location.

At step 103, the calculating apparatus may read, from the map, map information of a predetermined area including the location of the terminal. For example, the calculating apparatus may read, from a fingerprint map as illustrated in FIG. 2, map information of a peripheral area including the location of the terminal. In another example, the calculating apparatus may transfer the map to a unit to read the map information of the predetermined area. The map information may include, for example, a value (e.g., Cartesian coordinates) of a predetermined first location, and a value (e.g., Cartesian coordinates) of a predetermined second location, in the predetermined area.

At step 105, the calculating apparatus may calculate an accuracy of measuring the location of the terminal based on the map information of the predetermined area. For example, the calculating apparatus may calculate the accuracy of measuring the location based on a distance between the first location and the second location in the predetermined area, and a difference between a first point corresponding to the first location and a second point corresponding to the second location, in the map information. In this example, the calculating apparatus may calculate the accuracy of measuring the location only using the map information, without any other information. A method of calculating, by the calculating apparatus, the accuracy of measuring the location with the location measurement technology will be further described with reference to FIG. 2.

At step 107, the calculating apparatus may display, via the terminal, the accuracy of measuring the location of the terminal with to the location measurement technology. For example, the calculating apparatus may display, on a screen of the terminal, the accuracy of measuring the location with to the location measurement technology that is currently being used in the terminal, using, for example, a separate indicator, a sound, an icon change, and/or the like. In this example, the displayed accuracy of measuring the location may correspond to the accuracy of measuring the location that may be calculated in advance of actually measuring the location of the terminal.

In a location measurement technology, the accuracy of measuring the location may change according to corresponding changes sensed in a peripheral environment, for example, a current state of an infrastructure installation, a structure, a density of people, and/or the like. The accuracy of measuring the location may also change since different types of location measurement technologies may be used depending on different sections of an indoor environment. For example, the indoor environment may use a combination of location measurement technologies, e.g., a radio signal and a regional feature. Since the accuracy of measuring the location depending on a building or a section may be unstable, a user may be dissatisfied with the location measurement technologies.

After a function of measuring the location is executed without knowing an accuracy of measuring the location, and the accuracy of measuring the location decreases in comparison to a general case, a reliability of an apparatus configured to measure the location may be reduced. Accordingly, user dissatisfaction resulting from unstable indoor location measurement technology may be reduced by reporting the accuracy of measuring the location to the user in advance.

At step 109, the calculating apparatus may adjust a size of the predetermined area including the location of the terminal. At step 111, the calculating apparatus may recalculate the accuracy of measuring the location with the location measurement technology based on the map information of the adjusted predetermined area.

For example, when a predetermined time lapses after the accuracy of measuring the location is calculated in step 105, the accuracy of measuring the location and/or an error range of measuring the location may converge within a predetermined range. In this example, instead of an entire area (e.g., the predetermined area) of the map, a partial area (e.g., a window) of the map may be set to be a window in which an accuracy of measuring a location is to be recalculated. In another example, the calculating apparatus may calculate only an error within the predetermined area. A method of recalculating the accuracy of measuring the location when the accuracy of measuring the location converges within the predetermined range, will be further described with reference to FIG. 3.

Since, for example, a magnetic field distribution environment and a WLAN signal environment using a fingerprint may be very diverse, the accuracy of measuring the location may change depending on a situation. In this example, the calculating apparatus may allow a user to select a location measurement technology by reporting, to the user, the accuracy of measuring the location according to each of the location measurement technologies in advance of performing any of the location measurement technologies.

FIG. 2 illustrates an example of a fingerprint map that is used to calculate an accuracy of measuring a location. A method of estimating an accuracy of measuring a location of a terminal in an initial fingerprint map (e.g., an estimated error) may be expressed by Equation 1.

$$\text{Estimated Error} = \frac{1}{N} \sum_i \frac{\sum_j d_{ij} \cdot p(|m(i) - m(j)|)}{\sum_j p(|m(i) - m(j)|)}, \quad \text{[Equation 1]}$$

where $d_{ij}$ denotes a distance between a first location i and a second location j that are predetermined in a predetermined area. m(i) denotes a value of the fingerprint map in the first location i, and m(j) denotes a value of the fingerprint map in the second location j. That is, m(i) denotes a first point (e.g., Cartesian coordinates) corresponding to the first location i, and m(j) denotes a second point (e.g., Cartesian coordinates) corresponding to the second location j, in fingerprint map information. N denotes a number of points in the fingerprint map, and p(x) denotes a probability that an error of measurement for x may occur. p(x) may be determined by a sensor model, or may be determined by a predetermined function.

For example, a calculating apparatus may perform all calculations of Equation 1 based on the initial fingerprint map of a peripheral area 205 including the location of the terminal. In this example, the predetermined area may correspond to the entire fingerprint map of the peripheral area 205. Similarly, a size of a window used to calculate the accuracy of measuring the location may correspond to the entire fingerprint map of the peripheral area 205.

Figure 3:
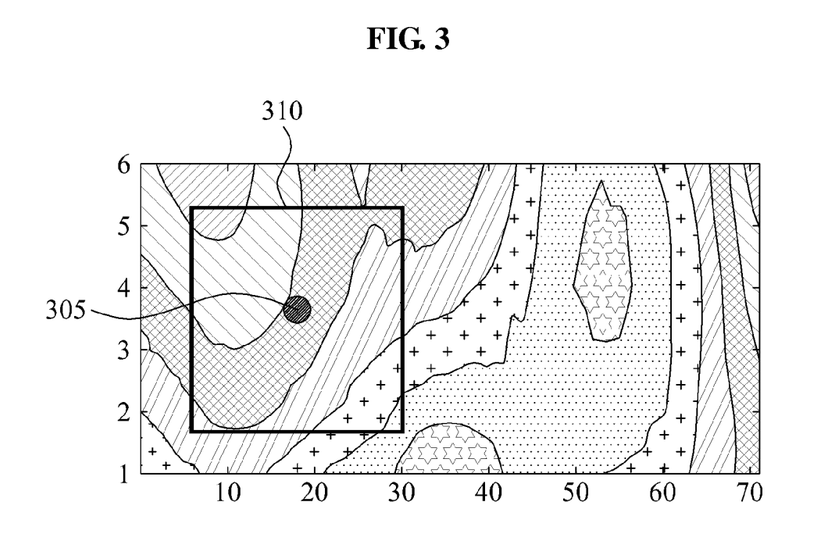
FIG. 3 is a diagram illustrating an example of adjusting a size of a predetermined area used to recalculate an accuracy of measuring a location.

FIG. 3 illustrates an example of adjusting a size of a predetermined area used to calculate an accuracy of measuring a location. When a predetermined time lapses after an accuracy of measuring a location of a terminal (e.g., the estimated error) is calculated (e.g., in step 105 of FIG. 1), an error range of measuring the location (e.g., the estimated error) may converge within a predetermined range. In this example, a calculating apparatus may recalculate the accuracy of measuring the location within a range of a window 310 that includes a location 305 of the terminal. This may be performed by setting the window 310, instead of the peripheral area 205, as the window in which the accuracy of measuring the location is to be recalculated. The recalculating of the accuracy of measuring the location may be expressed by Equation 2.

$$\text{Estimated Error} = \frac{1}{N} \sum_i \frac{\sum_{j, d_{ij} < D} d_{ij} \cdot p(|m(i) - m(j)|)}{\sum_{j, d_{ij} < D} p(|m(i) - m(j)|)}, \quad \text{[Equation 2]}$$

where D denotes a size of a defined window, e.g., the window 305.

In more detail, the calculating apparatus may initially set the window to the predetermined area (e.g., the peripheral area 205) including the location of the terminal. The calculating apparatus may adjust the size of the predetermined area by adjusting the size of the window to the window 310 that has a lesser or greater size than the predetermined area. The calculating apparatus may recalculate the accuracy of measuring the location based on Equation 2 and the map information of the adjusted predetermined area, for example, the window 310.

Figure 4:
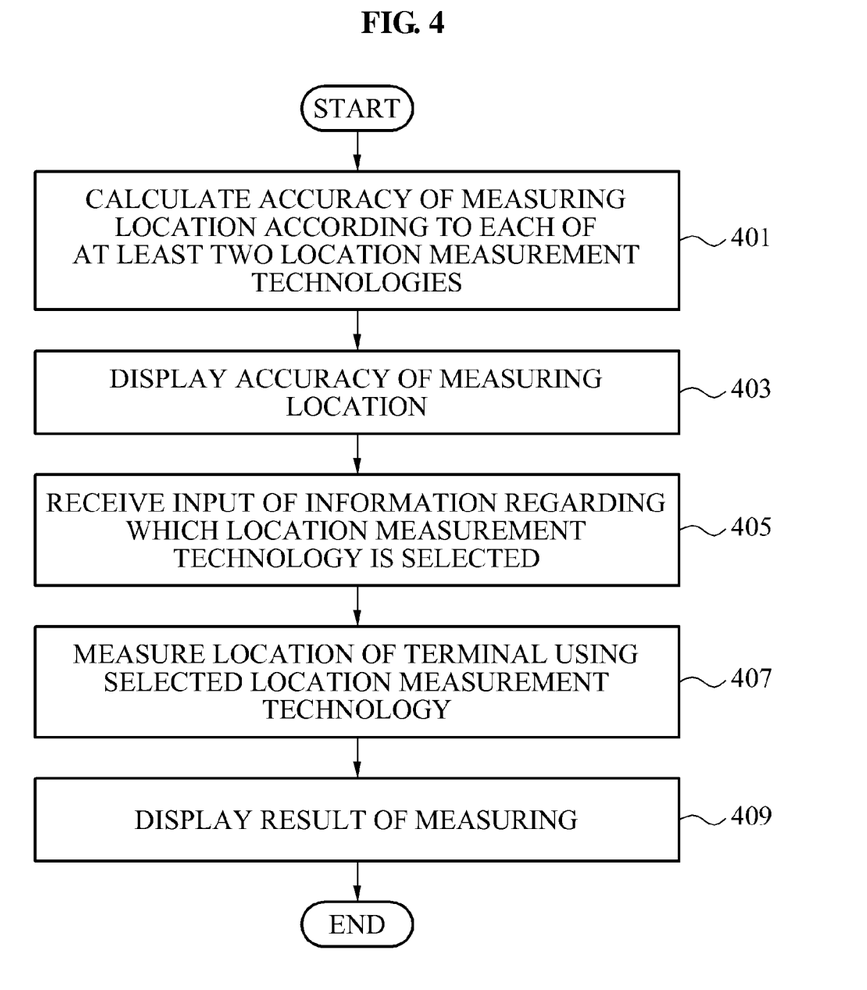
FIG. 4 is a flowchart illustrating an example of a method of measuring a location using an accuracy of measuring the location.

FIG. 4 illustrates an example of a method of measuring a location using an accuracy of measuring the location. At step 401, an apparatus configured to measure a location of a terminal may calculate an accuracy of measuring the location, according to each of at least two location measurement technologies based on the location of the terminal. The apparatus configured to measure the location will hereinafter be referred to as a "measuring apparatus". For example, the measuring apparatus may calculate accuracies of measuring the location using maps corresponding to respective ones of the at least two technologies. In this example, a location measurement technology A that may measure the location of the terminal using a magnetic field, and a location measurement technology B that may measure the location of the terminal using a WLAN, may be used. The measuring apparatus may calculate the accuracy of measuring the location using a geomagnetic fingerprint map corresponding to the location measurement technology A, and the accuracy of measuring the location using a WLAN fingerprint map corresponding to the location measurement technology B. A detailed method of calculating the accuracy of measuring the location will be described with reference to FIG. 5.

At step 403, the measuring apparatus may display, for a user of the terminal, the accuracy of measuring the location with each of the at least two location measurement technologies. For example, the measuring apparatus may display, on a screen of the terminal, the accuracies of measuring the location, using a graph and/or a separate indicator that may indicate the accuracy of measuring the location in the same manner as displaying a residual capacity of a battery.

Accordingly, in advance of actually measuring the location, the measuring apparatus may calculate the accuracies of measuring the location based on the maps of the peripheral area, corresponding to each of location measurement technologies, and may display a result of the calculating for a user, using various displaying schemes. By reporting, to the user in advance, the accuracies of measuring the location using each of the location measurement technologies, the measuring apparatus may reduce user dissatisfaction with an unstable indoor location measurement technology, and may allow the user to select a more stable location measurement technology.

At step 405, the measuring apparatus may receive, from the user of the terminal, an input of information regarding which location measurement technology is selected from the at least two location measurement technologies. At step 407, the measuring apparatus may measure the location of the terminal using the selected location measurement technology. At step 409, the measuring apparatus may display, on the terminal, a result of measuring the location of the terminal.

In an example, the measuring apparatus may select one of the at least two location measurement technologies based on the accuracy of measuring the location, instead of receiving, from the user of the terminal, the input of the information regarding which location measurement technology is selected. The measuring apparatus may measure the location of the terminal using the selected location measurement technology. In this example, the measuring apparatus may select a location measurement technology having a highest accuracy of measuring a location, in a current location. Accordingly, the measuring apparatus may provide an optimized result of measuring the location, the result being adaptive to, for example, a change resulting from a movement of the user, a change in a peripheral environment, and/or the like.

In another example, the measuring apparatus may adjust a size of a predetermined area including the location of the terminal. The measuring apparatus may initially set a size of a window in which the accuracy of measuring the location is initially calculated, to the predetermined area, and may adjust the size of the predetermined area by adjusting the size of the window to a size lesser or greater than the predetermined area. The measuring apparatus may recalculate the accuracy of measuring the location based on map information of the adjusted predetermined area (e.g., the adjusted window) corresponding to each of the at least two location measurement technologies.

Figure 5:
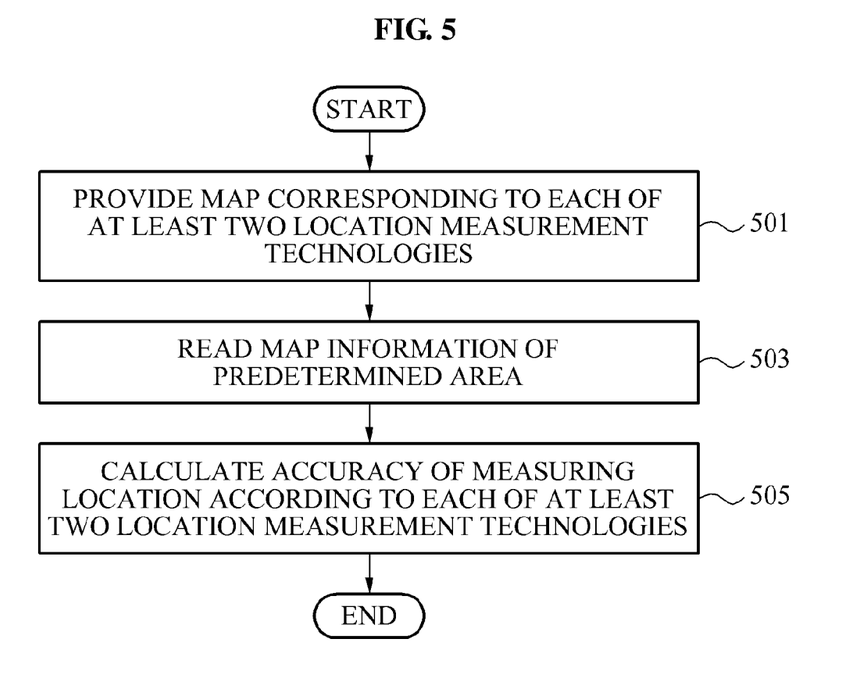
FIG. 5 is a flowchart illustrating an example of a method of calculating an accuracy of measuring a location according to each of at least two location measurement technologies in FIG. 4.

FIG. 5 illustrates an example of a method of calculating an accuracy of measuring a location according to each of at least two location measurement technologies in step 401 of FIG. 4. At step 501, a measuring apparatus may provide a map corresponding to each of at least two location measurement technologies (e.g., WLAN, magnetic field, etc.) that may be used in a terminal.

At step 503, the measuring apparatus may read, from the map corresponding to each of the at least two location measurement technologies, map information of a predetermined area including the location of the terminal. At step 505, the measuring apparatus may calculate an accuracy of measuring the location, based on the map information of the predetermined area, according to each of the at least two location measurement technologies. In this example, the measuring apparatus may calculate the accuracies of measuring the location using respective ones of the at least two location measurement technologies, based on a distance between a first location and a second location that are predetermined in the predetermined area, and a difference between a first point corresponding to the first location and a second point corresponding to the second location, in the map information.

Figure 6:
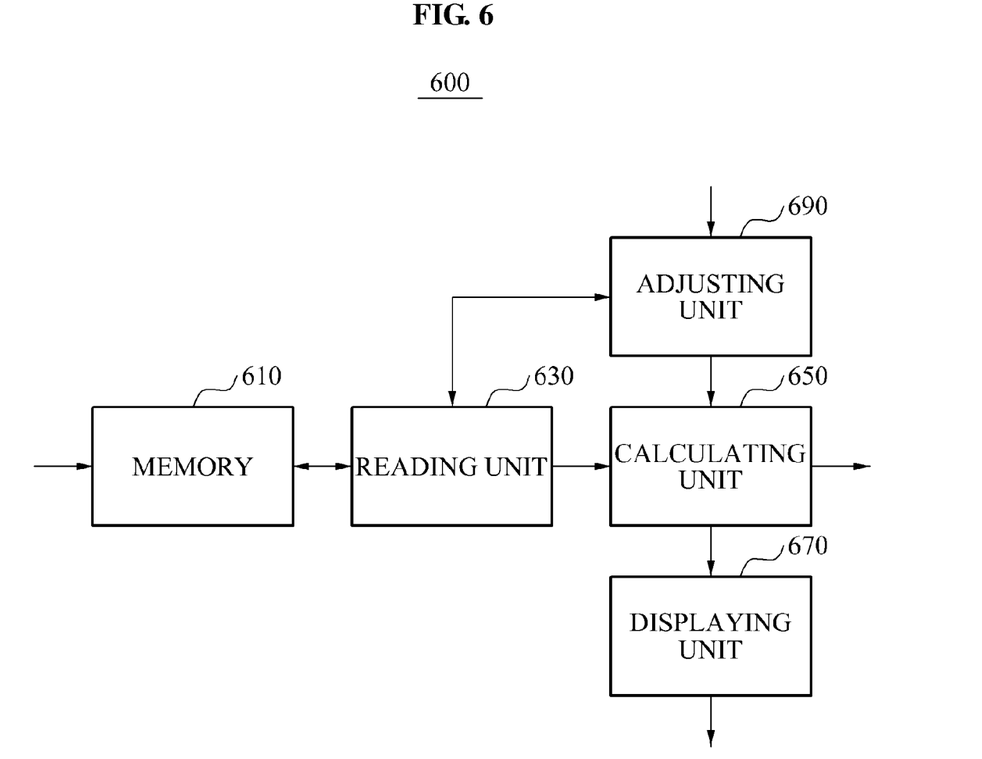
FIG. 6 is a block diagram illustrating an example of an apparatus configured to calculate an accuracy of measuring a location according to example embodiments.

FIG. 6 illustrates an example of an apparatus 600 configured to calculate an accuracy of measuring a location. The apparatus 600 may include a memory 610, a reading unit 630, and a calculating unit 650. The apparatus 600 may further include a displaying unit 670 and an adjusting unit 690.

The memory 610 may store a map corresponding to a location measurement technology (e.g., WLAN, magnetic field, etc.) that is used in a terminal. The reading unit 630 may read, from the map, map information of a predetermined area including a location of the terminal.

The calculating unit 650 may calculate an accuracy of measuring a location with the location measurement technology based on the map information of the predetermined area. For example, the calculating unit 650 may calculate the accuracy of measuring the location based on a distance between a first location and a second location that are predetermined in the predetermined area, and a difference between a first point corresponding to the first location and a second point corresponding to the second location, in the map information.

The displaying unit 670 may display, on the terminal, the accuracy of measuring the location using the location measurement technology. The adjusting unit 690 may adjust a size of the predetermined area by adjusting a size of a window that is used to recalculate the accuracy of measuring the location. In this example, the calculating unit 650 may recalculate the accuracy of measuring the location with the location measurement technology based on map information of the adjusted predetermined area, e.g., the adjusted window.

Figure 7:
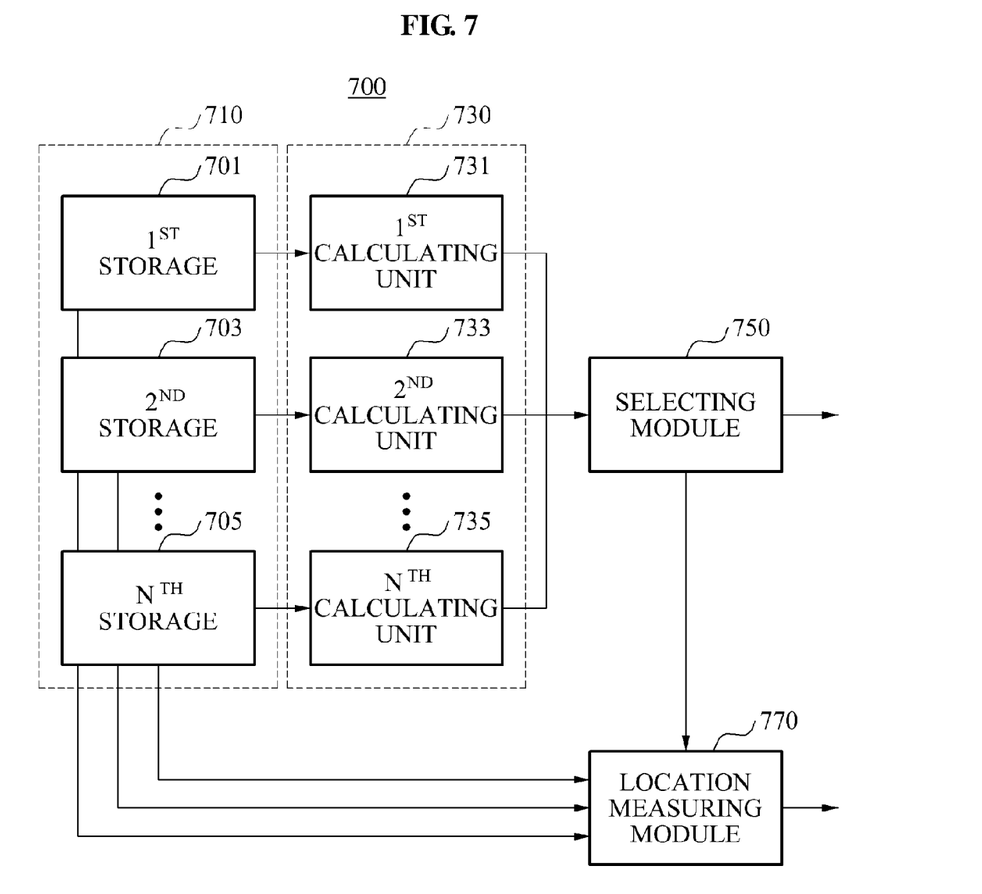
FIG. 7 is a block diagram illustrating an example of an apparatus configured to measure a location using an accuracy of measuring the location.

FIG. 7 illustrates an example of an apparatus 700 configured to measure a location using an accuracy of measuring the location. The apparatus 700 may include storages 701, 703, and 705, and calculating units 731, 733, and 735. Each of the storages 701, 703, and 705 may store a fingerprint map corresponding to each of at least two location measurement technologies, e.g., WLAN, magnetic field, etc. Each of the calculating units 731, 733, and 735 may calculate an accuracy of measuring a location with each of the at least two location measurement technologies based on the location of a terminal. For example, the calculating units 731, 733, and 735 may calculate accuracies of measuring the location using each of the location measurement technologies, by reading map information of a predetermined area including the location of the terminal, from fingerprint maps corresponding to the at least two location measurement technologies stored in the storages 701, 703, and 705, respectively.

A selecting module 750 may select one of the at least two location measurement technologies based on the accuracies of measuring the location according to each of the at least two location measurement technologies. A location measuring module 770 may measure the location of the terminal using the selected location measurement technology and the corresponding fingerprint map stored in one of the stores 701, 703, and 705.

In this example, the storages 701, 703, and 705 may constitute a single database 710. Also, the calculating units 731, 733, and 735 may constitute a single calculating module 730.

Figure 8:
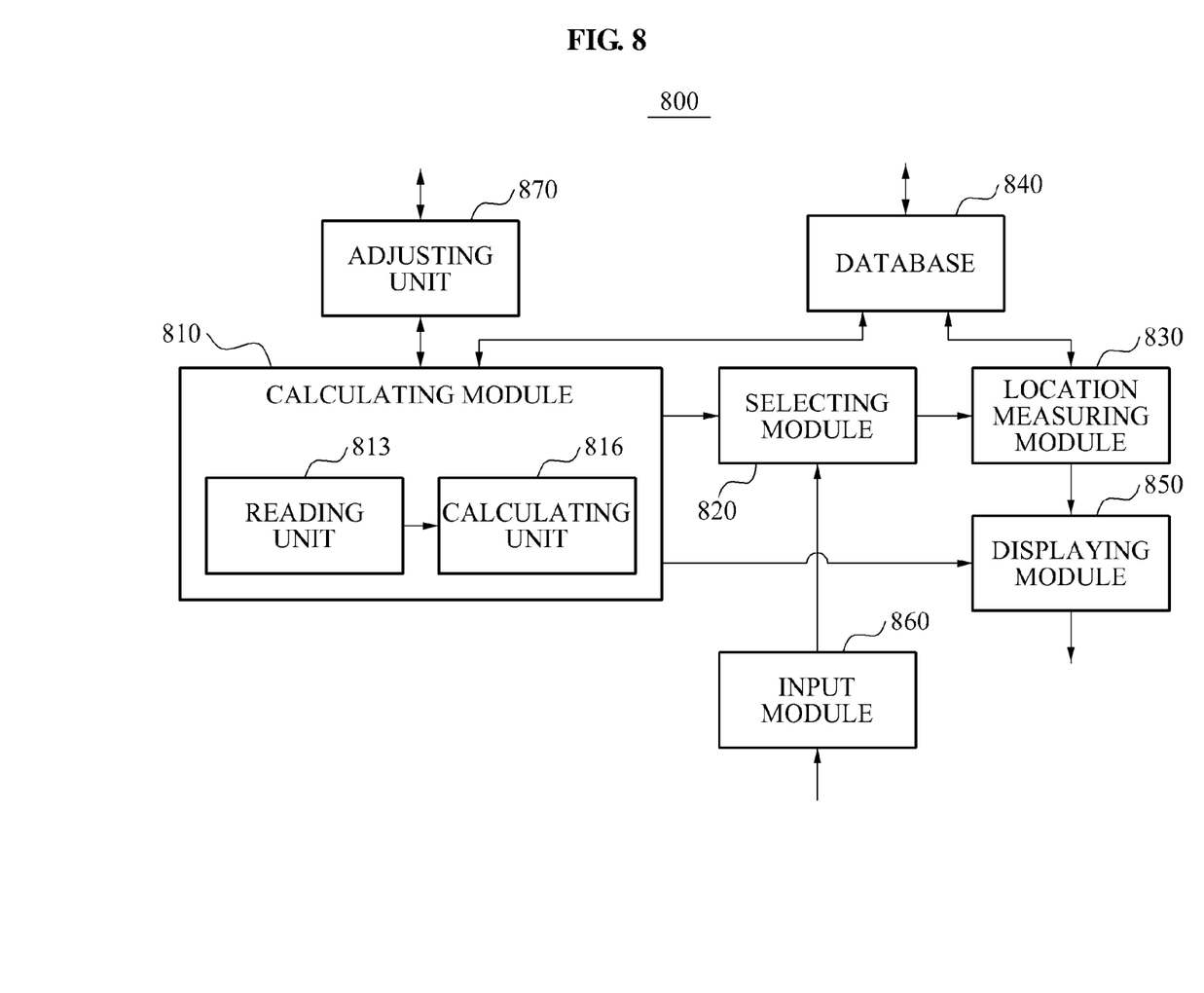
FIG. 8 is a block diagram illustrating an example of another apparatus configured to measure a location using an accuracy of measuring the location.

FIG. 8 illustrates an example of an apparatus 800 configured to measure a location using an accuracy of measuring the location. The apparatus 800 may include a calculating module 810, a selecting module 820, and a location measuring module 830. The apparatus 800 further includes a database 840, a displaying module 850, an input module 860, and an adjusting unit 870.

The calculating module 810 may calculate accuracies of measuring a location with each of at least two location measurement technologies based on the location of a terminal. In more detail, the calculating module 810 may calculate the accuracies of measuring the location based on a distance between a first location and a second location that are predetermined in the predetermined area, and a difference between a first point corresponding to the first location and a second point corresponding to the second location, in map information.

The calculating module 810 may include a reading unit 813 and a calculating unit 816. The reading unit 813 may read, from maps corresponding to each of the at least two location measurement technologies, the map information of a predetermined area including the location of the terminal. The calculating unit 816 may calculate the accuracies of measuring the location based on the map information of the predetermined area.

The selecting module 820 may select one of the at least two location measurement technologies based on the accuracy of measuring the location. The location measuring module 830 may measure the location of the terminal using the selected location measurement technology.

The database 840 may store the maps corresponding to each of the at least two location measurement technologies (e.g., WLAN, magnetic field, etc.) that may be used in the terminal. The displaying module 850 may display, for a user of the terminal, the accuracy of measuring the location using each of the at least two location measurement technologies.

The input module 860 may receive, from the user of the terminal, an input of information regarding which location measurement technology is selected from the at least two location measurement technologies. The adjusting unit 870 may adjust a size of the predetermined area by adjusting a size of a window including the location of the terminal that is used to calculate the accuracy of measuring the location. In this example, the calculating unit 816 may recalculate the accuracy of measuring the location with each of the at least two location measurement technologies based on map information of the adjusted predetermined area, e.g., the adjusted window.

According to the teachings above, there is provided an apparatus and method, which may provide an optimized result of measuring a location of a terminal to a user, by measuring the location using a location measurement technology having a highest accuracy of measuring the location, among a plurality of location measurement technologies, in a current location. In addition, it may be possible to allow a user to select a location measurement technology, by reporting in advance to the user, the accuracy of measuring the location with each of the location measurement technologies.

Further, it may be possible to reduce user dissatisfaction with an unstable indoor location measurement technology, by reporting in advance to the user, the accuracy of measuring the location using each of the location measurement technologies. A result of measuring the location may be adaptive to a change resulting from a movement of the user, a change in a peripheral environment, and/or the like, and may be provided by measuring the location of using the location measurement technology having the highest accuracy of measuring the location, in the current location.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of measuring a location of a terminal based on an accuracy of measuring the location, the method comprising:
   calculating the accuracy of measuring the location, of each of at least two location measurement types, based on the location of the terminal;
   setting a window with respect to a predetermined area including the location of the terminal when the accuracy of measuring the location converges within a predetermined range;
   recalculating the accuracy of measuring the location based on map information in the window;
   selecting one of the at least two location measurement types based on the accuracy of measuring the location, of each of the at least two location measurement types; and
   measuring the location of the terminal based on the selected one of the at least two location measurement types.

2. The method of claim 1, wherein the calculating of the accuracy of measuring the location further comprises:
   calculating the accuracy of measuring the location, of each of at least two location measurement types, based on the location of the terminal and a map of each of the at least two location measurement types.

3. The method of claim 1, wherein the calculating of the accuracy of measuring the location further comprises:
   providing a map of each of the at least two location measurement types that are used in the terminal;
   reading, from the map of each of the at least two location measurement types, map information of a predetermined area comprising the location of the terminal; and
   calculating the accuracy of measuring the location, of each of the at least two location measurement types, based on the map information.

4. The method of claim 3, wherein the calculating of the accuracy of measuring the location further comprises:
   calculating the accuracy of measuring the location, of each of the at least two location measurement types based on a distance between a first location and a second location that are predetermined in the predetermined area, and a difference between a first point corresponding to the first location and a second point corresponding to the second location, in the map information.

5. The method of claim 3, further comprising:
   adjusting the size of the predetermined area.

6. The method of claim 5, further comprising:
   recalculating the accuracy of measuring the location, of each of the at least two location measurement types, based on the map information of the adjusted predetermined area.

7. The method of claim 1, further comprising:
   displaying, for a user of the terminal, the accuracy of measuring the location, of each of the at least two location measurement types.

8. The method of claim 7, further comprising:
   receiving, from the user of the terminal, an input of information regarding the selected one of the at least two location measurement types.

9. A non-transitory computer-readable storage medium storing a program comprising instructions to cause a computer to perform the method measuring a location of a terminal based on an accuracy of measuring the location, the method comprising:
   calculating the accuracy of measuring the location, for each of at least two location measurement types, based on the location of the terminal;
   setting a window with respect to a predetermined area including the location of the terminal when the accuracy of measuring the location converges within a predetermined range;
   recalculating the accuracy of measuring the location based on map information in the window;
   selecting one of the at least two location measurement types based on the accuracy of measuring the location, for each of the at least two location measurement types; and
   measuring the location of the terminal based on the selected one of the at least two location measurement types.

10. An apparatus configured to measure a location of a terminal based on an accuracy of measuring a location, the apparatus comprising:
    a calculating module configured to calculate the accuracy of measuring the location, of each of at least two location measurement types, based on the location of the terminal;
    a selecting module configured to select one of the at least two location measurement types based on the accuracy of measuring the location, of each of the at least two location measurement types; and
    a location measuring module configured to measure the location of the terminal based on the selected one of the at least two location measurement types,
    wherein the calculating module is configured to set a window with respect to a predetermined area including the location of the terminal when the accuracy of measuring the location converges within a predetermined range, and to recalculate the accuracy of measuring the location based on map information in the window.

11. The apparatus of claim 10, further comprising:
    a database configured to store a map of each of the at least two location measurement types that are used in the terminal,
    wherein the calculating module further comprises:

a reading unit configured to read, from the map of each of the at least two location measurement types, the map information of a predetermined area comprising the location of the terminal; and a calculating unit configured to calculate the accuracy of measuring the location, of each of the at least two location measurement types, based on the map information.

* * * * *